United States Patent [19]
Ruppel

[11] Patent Number: 5,209,559
[45] Date of Patent: May 11, 1993

[54] TRAILER LIGHT SYSTEM

[76] Inventor: Raymond A. Ruppel, Rte. 5, Box 200, Vincennes, Ind. 47591

[21] Appl. No.: 802,218

[22] Filed: Dec. 4, 1991

[51] Int. Cl.[5] ............................................. B60Q 1/26
[52] U.S. Cl. ...................................... 362/80; 362/61; 362/369; 362/374
[58] Field of Search .................... 362/80, 72, 61, 306, 362/369, 374, 78

[56] References Cited

U.S. PATENT DOCUMENTS

| | | | |
|---|---|---|---|
| 1,515,156 | 11/1924 | Michel | 362/374 |
| 1,611,706 | 12/1926 | Adolphson et al. | 362/80 |
| 1,624,842 | 4/1927 | Matthews | 362/61 |
| 2,221,178 | 11/1940 | Best | 362/80 |
| 2,483,058 | 9/1949 | Mack | 362/80 |
| 2,579,653 | 12/1951 | Dawley | 362/80 |
| 2,615,084 | 10/1952 | Diebold | 362/374 |
| 3,032,646 | 5/1962 | Chieger | 362/278 |
| 4,255,781 | 3/1981 | Plemmons et al. | 362/374 |
| 4,297,675 | 10/1981 | Rubottom et al. | 362/61 |
| 4,309,742 | 1/1982 | Holm et al. | 362/78 |

FOREIGN PATENT DOCUMENTS

| | | | |
|---|---|---|---|
| 0423720 | 7/1947 | Italy | 362/80 |
| 0415914 | 9/1934 | United Kingdom | 362/80 |

Primary Examiner—Ira S. Lazarus
Assistant Examiner—Alan B. Cariaso
Attorney, Agent, or Firm—Jacobson, Price, Holman & Stern

[57] ABSTRACT

A vehicle lighting system for use with trucks or trailers which will assist a driver in observing conditions at the rear of the vehicle at night when backing, turning corners and the like by illuminating the rear wheels and areas adjacent the rear wheels of the vehicle. The lighting system includes a light unit mounted under a vehicle body above but forwardly and/or rearwardly of the rear wheels with the light unit being constructed in such a manner to direct a light beam downwardly and outwardly in relation to the vehicle body and wheels to illuminate ground surface areas and obstacles that may exist up to a certain height to enable a driver to more safely operate a vehicle at night and avoid the possibility of the light shining into the eyes of other vehicle operators.

10 Claims, 2 Drawing Sheets

TRAILER LIGHT SYSTEM

BACKGROUND OF THE INVENTION

1. Field of the Invention

The present invention generally relates to a vehicle lighting system and more specifically to a lighting system especially adapted for use with trucks or trailers which will assist a driver in observing conditions at the rear of the vehicle at night when backing, turning corners and the like by illuminating the rear wheels and areas adjacent the rear wheels of the vehicle. The lighting system includes a light unit capable of different modes of operation which is mounted under a vehicle body forwardly and/or rearwardly of the rear wheels with the light unit being constructed in such a manner to direct a light beam downwardly and outwardly in relation to the vehicle body and wheels to illuminate ground surface areas and obstacles that may exist up to a certain height to enable a driver to more safely operate a vehicle at night and avoid the possibility of the light shining into the eyes of other vehicle operators.

2. Description of the Prior Art

Vehicles have been provided with various types of lights to enable safer operation at night including lights which project forwardly of the vehicle and backup lights which illuminate areas to the rear of a vehicle. Running lights are provided on load carrying bodies of truck or trailer type vehicles to enable approaching drivers to more easily see a vehicle. Efforts have been made to provide auxiliary lights which are actuated in response to steering control of a vehicle. My prior U.S. Pat. No. 4,024,497 discloses a lighting system in which additional lights are energized when the existing running lights and brake lights are energized. The following U.S. patents are also relevant to this field of endeavor.

U.S. Pat. No. 3,032,646
U.S. Pat. No. 4,006,453
U.S. Pat. No. 4,297,675
U.S. Pat. No. 4,309,742
U.S. Pat. No. 4,325,052
U.S. Pat. No. 4,725,928

The above patents do not disclose the specific structure of the above invention including the association of the light unit with respect to the vehicle body and rear wheels to project a light beam downwardly and outwardly in relation to the rear wheels to illuminate the rear wheels and an area adjacent the rear wheels of the vehicle to enable a vehicle operator to operate the vehicle more safely at night.

SUMMARY OF THE INVENTION

An object of the present invention is to provide automatic rear lighting capability on truck or trailer type vehicles to increase driving safety at night when the vehicle is cornering, backing up, braking, moving or stopping by improving nighttime driving and maneuvering rear vision for the vehicle operator.

Another object of the invention is to provide a vehicle lighting system which will illuminate the vehicle rear wheels and adjacent surface areas and adjacent obstacles, if present, up to a predetermined height which includes a light unit constructed and mounted in a manner to provide a downwardly and outwardly directed light beam with the light unit being positioned above but forwardly and/or rearwardly of the wheels and inwardly of the outer surfaces of the vehicle to assure proper illumination of the desired surface areas without blinding other vehicle operators, pedestrians and the like.

A further object of the invention is to provide a light unit for a truck or trailer type vehicle which is associated with the rearmost wheels on the vehicle to illuminate the wheels and surrounding areas to facilitate nighttime operation of the vehicle in a safe manner by illuminating hazards, obstacles or other conditions adjacent the rear wheels of the vehicle during normal operation at night.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
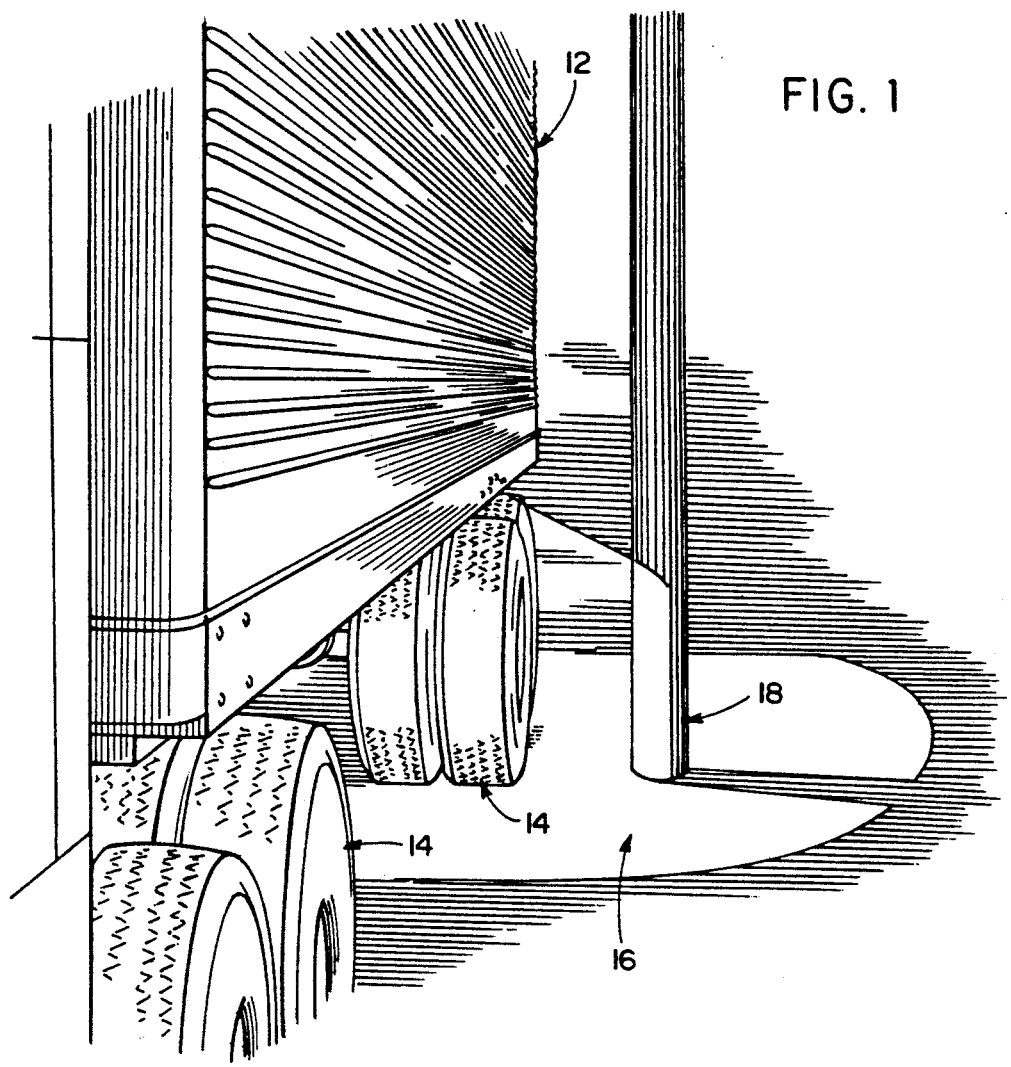
FIG. 1 is a perspective view of a trailer illustrating the rear wheels and adjacent surface areas and obstacles illuminated by the light unit of the present invention.
Figure 2:
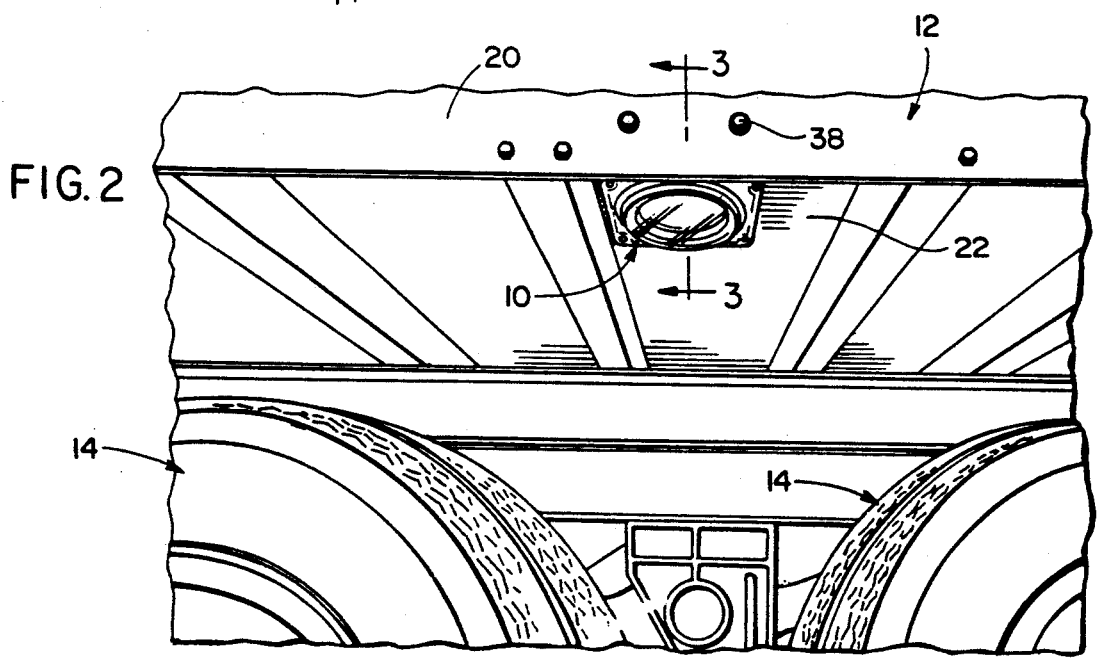
FIG. 2 is a perspective view looking upwardly at the undersurface of a trailer load body illustrating one mounting position of the light unit between the wheels of a tandem wheel assembly.
Figure 3:
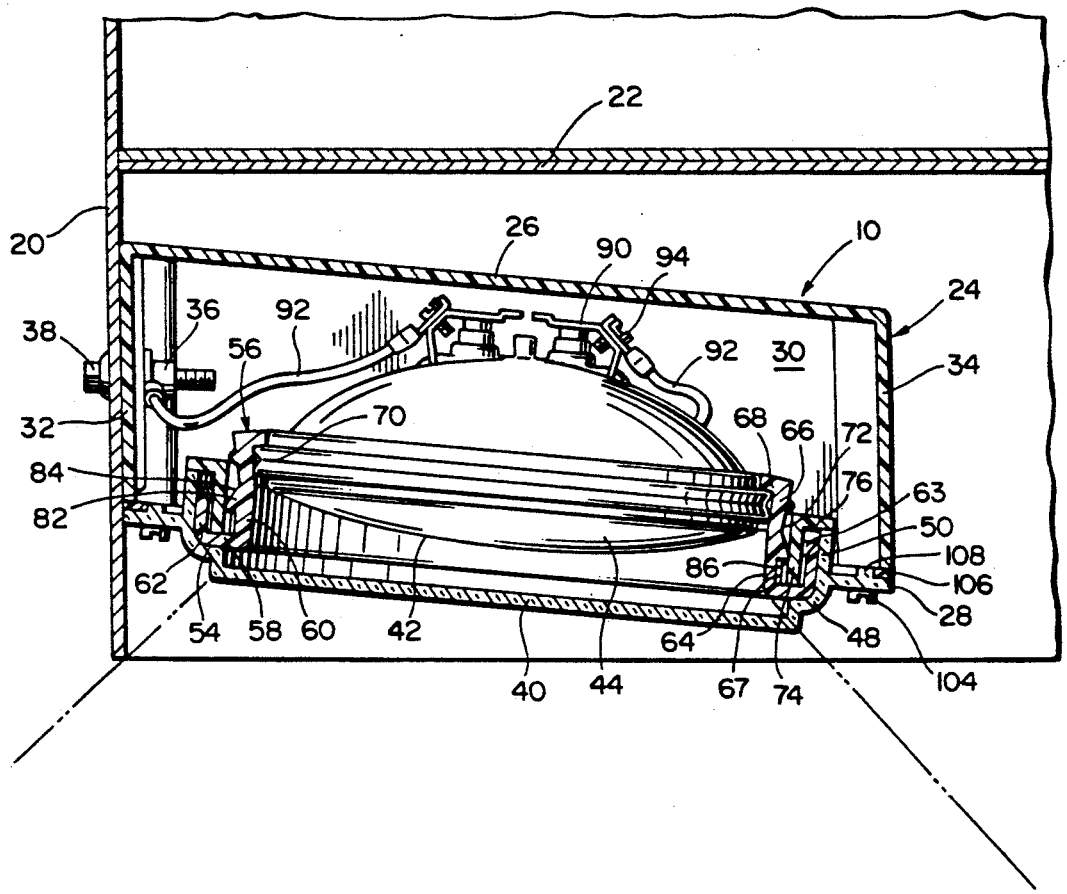
FIG. 3 is a sectional view taken substantially upon a plane passing along section line 3—3 on FIG. 2 and on an enlarged scale illustrating structural details of the light unit.
Figure 4:
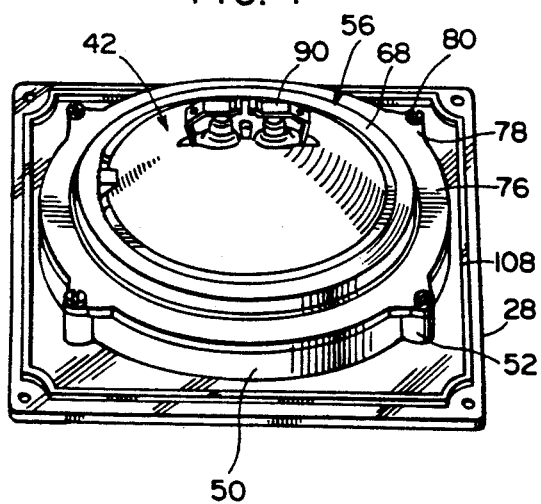
FIG. 4 is a top perspective view of the bottom wall and sealed beam light assembly of the light unit.
Figure 5:
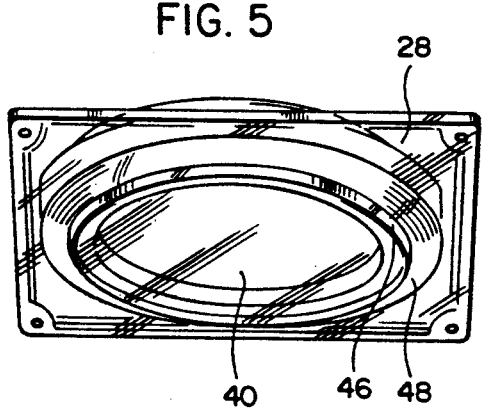
FIG. 5 is a bottom perspective view of the assembly of FIG. 4.

The light unit of the present invention is generally designated by reference numeral 10 and is illustrated in association with a vehicle load carrying body generally designated by reference numeral 12 which, as illustrated in FIG. 1, is the load carrying body of a trailer having tandemly arranged rear wheel assemblies 14 supported therefrom in a conventional manner with the light unit 10 being constructed and mounted in such a manner to illuminate an area of the ground surface generally designated by reference numeral 16 and obstructions such as a telephone line or electric line supporting pole 18, street curb, or other similar obstructions which frequently are encountered when maneuvering a trailer 12 at night. As illustrated in FIGS. 2 and 3, the light unit 10 is mounted from a vertically disposed sidewall or frame member 20 below a floor or bottom frame member 22 of the trailer 12 with the light unit 10 being positioned generally above and between the tandem wheel assemblies 14. However, the light unit 10 can be mounted in front of or rearwardly of the tandem wheel assemblies 14 or a single wheel assembly if desired. If only a single wheel is provided, the light may be in front of or in back of the wheel and likewise, the position of the light unit in relation to tandem wheel assemblies can be varied to lower the area of illumination as desired as shown in FIG. 1.

The light unit 10 includes a mounting box or casing 24 which includes an upper wall 26, and a removable lower wall 28 paralleling each other with the lower wall being spaced from and connected to the upper wall 26 by front and rear walls 30 which are perpendicular to the walls 26 and 28 and an outer wall 32 and an inner wall 34 which are perpendicular to the front and rear walls 30 but slightly inclined in relation to the upper and lower walls 26 and 28 as illustrated in FIG. 3 with the outer wall 32 and the inner wall 34 being parallel to each other. The outer wall includes a pair of internally threaded adapters 36 receiving a pair of fastener bolts 38 which mounts the inclined inner wall 32 against the vertical inner surface of the side wall or flange 20 on the trailer 12 thus orienting the upper and lower walls 26 and 28 inclined with the inner wall 34 being positioned slightly lower than the outer wall 32.

The lower wall 28 includes an enlarged central offset area 40 which receives a lamp assembly 42 which may be a sealed beam unit or the like provided with a downwardly exposed lens 44. The removable bottom wall 28 is constructed of transparent plastic material such as "Lexan" and is generally circular in configuration and spaced from the lens 44 of the sealed beamed unit 42. The offset area 40 is joined to the bottom wall 28 by a peripheral upwardly extending flange 46 which merges with an outwardly and upwardly curved transition flange 48 which joins with the planar portion of bottom wall 28 and extends vertically from wall 28 as a circular flange 50 which has four vertical bosses 52 on the exterior thereof.

The upwardly facing juncture between flange 46 and transition flange 48 defines an upwardly facing horizontal shoulder 54 which supportingly engages a mounting and supporting ring 56 for the sealed beam unit 42. The ring 56 includes a lower generally horizontal, downwardly facing flange 58 integral with an inner generally cylindrical wall 60 and a outer cylindrical wall 62 of less height. The flange 58 engages shoulder 54 and the outer wall 62 closely fits the transition flange 48 and vertical flange 50 with the upper edge of the outer wall 62 terminating in an inturned flange 63 below the upper edge of the flange 50.

The inner wall 60 includes an upwardly extending lower portion which tapers inwardly at a small degree of taper at 64 and an upper cylindrical portion 66 which terminates in an inwardly extending peripheral horizontal flange 68 at its upper edge. The outer surface of the lower portion of inner wall 60 includes vertical stiffening ribs 67. The ring 56 is constructed of resilient material such as rubber or the like and tightly fits a peripheral flange 70 on the sealed beam unit 42 with the tapered portion 64 enabling the ring 56 and the sealed beam unit 42 to be assembled by forcing the seal beam unit up into the ring 56 until the flange 68 engages the upper surface of the flange 70 on the sealed beam unit 42. The sealed beam unit 42 is of conventional construction and includes the lens 44 and the flange 70 as an integral part thereof.

The exterior surface of the inner wall 60 is spaced from the outer wall 62 to form an upwardly facing groove or recess 72 which receives a depending cylindrical flange 74 on a retaining or clamping ring 76 of rigid construction which is horizontally disposed and rests against the upper edge of flange 50. The ring 76 includes outwardly extending tabs 78 overlying the bosses 52 to receive retaining screws 80 therethrough to clamp the ring 76 securely in place with the lower edge of the flange 74 clamping the horizontal flange 58 downwardly onto the shoulder 54 in sealed relation. The periphery of the flange 68 due to the snug engagement of the upper wall portion 66 which has been somewhat extended when the sealed beam unit is forced into the ring 56 forms an effective seal between the sealed beam unit and the ring 56 all of which effectively seals the interior of the offset portion of the bottom wall with the sealed beam unit to prevent ingress of any material which would occlude transparency of the interior of the offset portion 40 of the bottom wall 28.

Th exterior surface of the inner wall 60 tapers inwardly and includes an outwardly extending peripheral flange 82 which has an outwardly curved upper surface 84 and a horizontal bottom surface 86 which engages the interior surface of the flange 74 on the clamping ring 76 to further form a seal and cushioning support for the sealed beam unit 42.

The sealed beam unit 42 includes connector units 90 provided with electrical conductors 92 secured thereto by screws 94. One conductor 92 extends through an opening at the juncture between the front or rear wall 30 and the lower wall 28 with both the front and rear walls 30 having an identical opening therein to enable the electrical conductor 92 to extend outwardly of the housing 2 in either direction. A sealing grommet is provided for the opening and conductor 92 and a plug is provided for the unused opening. A conventional connector is provided on the conductor 92 to enable the light unit 10 to be connected to a source of electrical energy in a manner to enable optional operational characteristics as set forth hereinafter. The other conductor 92 is connected to ground at adapter 36.

The light unit 10 includes a structure in which the bottom wall 28 is removable by the use of screw threaded fasteners 104 and a gasket 106 mounted on a thickened edge portion 108 of wall 28. This enables the sealed beam unit 42 to be easily changed in the event it becomes inoperative. Also, the casing 24 is completely waterproof and may be constructed of rigid plastic material that is resistant to breakage and provides a durable and longlasting structure.

The slanted housing enables the light unit to be mounted against the inner surface of the vertical side wall or side flange above and forwardly and/or rearwardly of the vehicle wheels to illuminate downwardly and outwardly at an angle of approximately 5°. The light unit includes the use of a circuit board arrangement utilizing solid state components rather than relay switches and other mechanical components disclosed in my prior U.S. Pat. No. 4,024,497. The light unit can be arranged for different operational modes in response to turn signal and/or emergency flasher operation. Attached hereto is a System Summary and Installation Instructions (23 pages) and schematic wiring diagrams for a one way and four way unit (page 24) and a two way unit (page 25) setting forth actual installation instructions as well as detailed information relating to the benefits including reproductions of photograph illustrating pictorially the functional advantages of the unit when operating a trailer at night. The attached booklet (Exhibit A) is incorporated herein as a portion of the disclosure in this application. The control unit for operating the light unit 10 is mounted interiorly or just outside of the turn signal control box normally provided in load carrying vehicles thereby eliminating the addition of control units in the vehicle cab. Also, the light unit, when energized, will be continuously illuminated rather than flashing when the vehicle running lights are energized. During one-way operation, there is a separate control to energize either the right or left light unit along with the turn signal. During four way operation, the light units operate separately when right or left turn signals are activated and all light units operate when the emergency flashes operate. During two way operation, the light units operate separately from the right or left turn signal but do not operate when the emergency flashes are used.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a vehicle including a load carrying body having a rear wheel assembly at each side of the rear portion of the body, said vehicle including front steerable wheels spaced a substantial distance from the rear wheel assemblies whereby the rear wheel assemblies do not track in the same path as the front path steerable wheels when the vehicle makes a turn, the improvement comprising illuminating means mounted on the load body above but forwardly and/or rearwardly of each rear wheel assembly, each illuminating means including a lamp assembly and means mounting the lamp assembly from the load body to direct a continuous light beam, when energized, downwardly and outwardly at a small angle to illuminate the rear wheel assembly and surface areas adjacent thereto to enable an operator of the vehicle to observe the position of the rear wheel assemblies and the areas adjacent to the rear wheel assemblies during nighttime operation of the vehicle without binding other vehicle operators and pedestrians.

2. In combination with a vehicle including a load carrying body having a rear wheel assembly at each side o the rear portion of the body, said vehicle including front steerable wheels spaced a substantial distance from the rear wheel assemblies whereby the rear wheel assemblies do not track in the same path as the front steerable wheels when the vehicle makes a turn, the improvement comprising illuminating means mounted on the load body above but forwardly and/or rearwardly of each rear wheel assembly, each illuminating means including a lamp assembly and means mounting the lamp assembly from the load body to direct a continuous light beam, when energized, downwardly and outwardly at a small angle to illuminate the rear wheel assembly and surface areas adjacent thereto to enable an operator of the vehicle to observe the position of the rear wheel assemblies and the areas adjacent to the rear wheel assemblies during nighttime operation of the vehicle without blinding other vehicle operators and pedestrians, said mounting means including a housing, means resiliently supporting the lamp assembly in the housing, said housing including an inclined mounting surface which has a lower portion closer to the light beam emitted by the lamp assembly that the upper portion of the mounting surface, said mounting surface engaging a vertical support surface on the vehicle body and extending inwardly therefrom, fastener means securing the mounting surface to the support surface thereby orienting the lamp assembly to emit a light beam downwardly and outwardly of the rear wheel assembly to illuminate the rear wheel assembly and adjacent areas.

3. The combination as defined in claim 2 wherein said vehicle includes running lights and turn signals activated by the vehicle operator to indicate that the vehicle is making a turn, said lamp assembly being electrically connected with the running lights and turn signals to be continuously energized when the running lights and turn signals are energized for automatically energizing the lamp assembly to the side of the vehicle on which the turn signal was activated and continuously illuminating the rear wheel assembly and adjacent areas when the vehicle is making a turn.

4. The combination as defined in claim 3 wherein said vehicle includes emergency flashers activated by vehicle operator controls, all of said lamp assemblies being electrically connected with the controls to be continuously energized when the running lights, turn signals and flashers are energized.

5. The combination as defined in claim 2 wherein said housing includes a bottom wall having a downwardly offset transparent central member, said means resiliently supporting the lamp assembly in the housing including a resilient supporting ring engaged with the downwardly offset member and resiliently and snuggly engaged with the lamp assembly, clamp ring means engaging the resilient ring and clamping the resilient ring to the offset central member in the bottom wall of the housing for sealingly and resiliently supporting the lamp assembly from said member.

6. The combination as defined in claim 5 wherein said offset central member includes an upwardly facing shoulder engaging a lower surface of the resilient mounting ring, said clamping ring including a depending flange retaining the resilient mounting ring against said shoulder.

7. In combination with a vehicle including a load carrying body having a rear wheel assembly at each side of the rear portion of the body, said vehicle including front steerable wheels spaced a substantial distance from the rear wheel assemblies whereby the rear wheel assemblies do not track in the same path as the front steerable wheels when the vehicle makes a turn, the improvement comprising illuminating means mounted on the load body above but forwardly and/or rearwardly of each rear wheel assembly, each illuminating means including a lamp assembly and means mounting the lamp assembly from the load body to direct a continuous light beam, when energized, downwardly and outwardly at a small angle to illuminate the rear wheel assembly and surface areas adjacent thereto to enable an operator of the vehicle to observe the position of the rear wheel assemblies and the areas adjacent to the rear wheel assemblies during nighttime operation of the vehicle without blinding other vehicle operators and pedestrians, said mounting means including a housing, said housing including vertically disposed side walls with one of said side walls engaging the interior of a vertical wall defining a periphery of the load carrying body with the housing extending inwardly from the interior surface of the vertical wall to eliminate outwardly extending obstructions on the load body.

8. The combination as defined in claim 7 wherein said housing includes an upper wall and a lower wall which extend inwardly and downwardly inclined from the side wall mounted on the interior surface of the vertical wall of the load body, said lamp assembly including a reflector and lens assembly positioned within said housing, said bottom wall of the housing including an enlarged transparent member aligned with and spaced from the lens of the lamp assembly and means resiliently supporting said lamp assembly from said transparent member, said lamp assembly being oriented to emit a light beam generally in perpendicular relation to the upper wall and in a downwardly and outwardly inclined relation to the vertical wall of the load body.

9. The combination as defined in claim 8 wherein said said light beam is downwardly and outwardly inclined at an angle of approximately 5° thereby avoiding the light beam interfering with the vision of other vehicle operators and pedestrians.

10. The combination as defined in claim 9 wherein said resilient means supporting the lamp assembly including an annular resilient member engaging a peripheral edge of the lamp assembly and extending downwardly therefrom toward said transparent member and terminating in a reversely formed outwardly extending and upwardly opening channel-shaped member, said transparent member including a shoulder supportingly engaging the bottom end of the resilient member, a retainer ring having a depending flange extending into the upwardly opening channel of the resilient member, and means securing the retaining ring to said transparent member with the flange on the retaining ring clamping an inner bottom portion of the channel on the resilient member against the shoulder on the transparent member to provide a seal for the space between the lens of the lamp assembly and the transparent member.

* * * * *